United States Patent [19]

Kakuta et al.

[11] Patent Number: 4,799,762
[45] Date of Patent: Jan. 24, 1989

[54] RESIN COMPOSITE

[75] Inventors: Tatsuya Kakuta; Nobuhiro Akasaka, both of Kanagawa, Japan

[73] Assignee: Sumitomo Electric Industries, Ltd., Osaka, Japan

[21] Appl. No.: 60,613

[22] Filed: Jun. 11, 1987

[30] Foreign Application Priority Data

Jun. 13, 1986 [JP]  Japan ................................. 61-136219
May 22, 1987 [JP]  Japan ................................. 62-123917

[51] Int. Cl.$^4$ ............................ G02B 6/00; G02B 6/10
[52] U.S. Cl. ................................. 350/96.34; 350/96.30
[58] Field of Search ............................ 350/96.30, 96.34

[56]  References Cited

FOREIGN PATENT DOCUMENTS 3108109  9/1982  Fed. Rep. of Germany ... 350/96.34
4132169  4/1986  World Int. Prop. O. .

Primary Examiner—William L. Sikes
Assistant Examiner—Akm E. Ullah
Attorney, Agent, or Firm—Cushman, Darby & Cushman

[57]  ABSTRACT

A resin composite formed by uniting a resin having a negative coefficient of linear expansion and another resin having a positive coefficient of linear expansion into one body, thereby to reduce the influence of distortion with change of temperature on other compositions in the vicinity of the resin composite.

5 Claims, 1 Drawing Sheet

RESIN COMPOSITE

BACKGROUND OF THE INVENTION

1. Field of the Invention

The present invention relates to a novel resin composite which can be used in various fields of industry. For example, when the invention is applied to a material, such as a precise molding material, a heat-resistant transformable material, an optical fiber coating material, or the like, the invention can provide a resin composite which is little distorted with the change of temperature so that other compositions in the vicinity of the resin composite are little influenced by the distortion of the resin composite.

2. Prior Art

Most of general resins so called engineering plastics have a positive coefficient of linear expansion. The value of the coefficient is so large as to be of the order to $10^{-4}/°C$. If various kinds of fillers, such as glass fiber, carbon fiber and the like, or various kinds of beads are added thereto, or if other resins are compounded thereto, the coefficient of linear expansion is still so large as to be of the order of $10^{-5}/°C$. at best. Recently, there has been developed liquid-crystal polymers with a coefficient of linear expansion of the order of $10^{-6}/°C$. However, the liquid-crystal polymers are different from widely used resins or other compounds besides resins in that the liquid-crystal polymers generally have a negative coefficient of linear expansion. That is, the liquid-crystal polymers belong to a specific category. Accordingly, the present situation is such that those widely used resins and the liquid-crystal polymers are individually used for utilizing the individual characteristics thereof singly.

However, in the case where those widely used resins or the liquid-crystal polymers are used individually or singly, there arises such a problem that considerable distortion occurs in other compositions in the vicinity of the resins or the liquid-crystal polymers with the change of temperature from low to high or from high to low, because the coefficient of linear expansion is too large or because the coefficient of linear expansion is negative even if it is small.

SUMMARY OF THE INVENTION

Accordingly, an object of the present invention is to solve the aforementioned problem and to provide a novel resin composite which little exerts the influence of distortion on other compositions in the vicinity of the novel resin composite even if the temperature change is wide.

This object can be achieved by a resin composite according to this invention which is formed by uniting a resin having a negative coefficient $\alpha$ of linear expansion and another resin having a positive coefficient $\alpha'$ of linear expansion into one body to thereby establish a coefficient of linear expansion within a range of from $-10^{-5}$ to $10^{-5}/°C$, the resin having the negative coefficient $\alpha$ of linear expansion being preferably composed of a high-oriented resin or a liquid-crytstal polymer.

DETAILED DESCRIPTION OF THE INVENTION

The present invention will be described in more detail with reference to the accompanying drawings.

Figure 1:
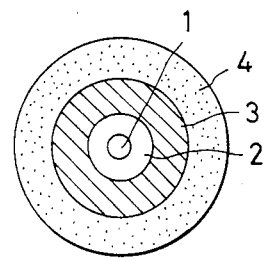
FIG. 1 is a sectional view of an optical fiber coated with the resin composite according to the present invention.

FIG. 1 shows an embodiment of the present invention. In FIG. 1, the reference numeral 3 designates a liquid-crystal polymer having a negative coefficient $\alpha$ of linear expansion, and the reference numeral 4 designates a resin having a positive coefficient $\alpha'$ of linear expansion, the liquid-crystal polymer 3 and the resin 4 being united into one body to form a resin composite. The reference numeral 1 designates an optical fiber, and the reference numeral 2 designates a cushion layer for protecting the optical fiber. In this embodiment, the optical fiber 1 corresponds to one of the other compositions in the vicinity of the resin composite.

The liquid-crystal polymer 3 having a negative coefficient $\alpha$ of linear expansion and the resin 4 having a positive coefficient $\alpha'$ of linear expansion can be brought into sufficiently close contact with each other by one-by-one coating, but it is preferable from the viewpoint of improving the close contact that the liquid-crystal polymer 3 and the resin 4 are united into one body by simultaneous extrusion of two layers when the coated optical fiber is prepared by extrusion.

When the optical fiber is used as one of the other compositions in the vicinity of the resin composite of the invention as shown in FIG. 1, the distortion of the resin composite caused by the change of temperature becomes almost zero relative to the optical fiber. Accordingly, the invention has such an effect that the transmission loss of the optical fiber is not increased in spite of the change of temperature.

The aforementioned operation or effect of the invention is considered as follows. The coefficient of linear expansion of the liquid-crystal polymer is so small as to be of the order of $10^{-6}/°$ C. and near the coefficient of linear expansion of glass $10^{-7}/°$ C. However, the coefficient of linear expansion of the liquid-crystal polymer generally takes a negative value while the coefficient of linear expansion of glass takes a positive value. Accordingly, in the case of the low temperature of $-60°$ C., the difference in sign between the coefficients makes fine distortion of the optical fiber. The fine distortion appears in the form of increase of transmission loss in the optical fiber coated with the liquid-crystal polymer having a negative coefficient of linear expansion.

On the other hand, in the case of the resin composite of the present invention which is formed by uniting a liquid-crystal polymer as a resin having a negative coefficient $\alpha$ of linear expansion and another resin having a positive coefficient $\alpha'$ of linear expansion into one body, the resin having a positive coefficient $\alpha'$ of linear expansion compensates for the distortion due to the negative linear expansion of the liquid-crystal polymer by acting in the direction of positive linear expansion in a fine level so that the other composition (in this embodiment, the optical fiber) in the vicinity of the resin composite is substantially free from distortion due to the resin composite. Accordingly, in the case where the optical fiber is coated with the resin composite, transmission loss does not increase even at the temperature of −60° C.

When a polyamide-group resin or fluoro resin having so large coefficient as to be of the order of $10^{-4}$ is used as the resin having a positive coefficient $\alpha'$ of linear expansion, it seems as if the linear expansion of the resin acts too greatly. However, in practice, it is considered that distortion due to the resin having a positive coefficient $\alpha'$ of linear expansion is very small because the liquid-crystal polymer has a low efficient of linear expansion and a high elastic modulus. Accordingly, there is no problem in the use of the aforementioned resin in practice.

Examples of the resin having a negative coefficient a of linear expansion used in the present invention, include liquid-crystal polymers, such as aromatic polyesters, aromatic-aliphatic polyesters, aromatic poly(ester-amide)s, aromatic-aliphatic poly(ester-amide)s, aromatic polyazomethynes, and aromatic polyester carbonates, and preferably thermo-plastic liquid-crystal high molecular compounds having the coefficient of linear expansion of from the order $-10^{-5}/°$ C. to the order $-10^{-7}/°$C., preferably from $-5 \times 10^{-6}$ to $-8 \times 10^{-6}/°$ C., such as aromatic polyesters containing 2,6 naphtalenedioxy moiety

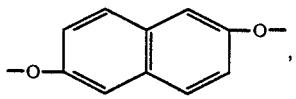

terephthaloyl moiety

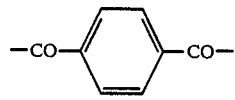

and p-oxybenzoyl moiety

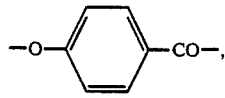

and aromatic-aliphatic polyesters containing terephthaloyl moiety and polyethylene terephthalate moiety

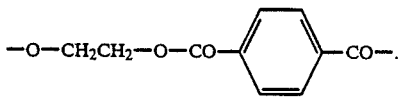

Examples of the resin having a positive coefficient $\alpha'$ of linear expansion used in the present invention, include thermo-plastic resins, such as polyamides, polyamide elastomers, polyester elastomers, polyurethanes, polyesters, polyethylenes, polyvinyl chlorides, polystyrenes, polyfluorocarbons and the like, and resins cross-linked by heat, light, water, electron beam or the like so as to be hardened, such as epoxy polymers, acryl polymers and the like. It is preferable that the value of $\alpha'$ is so small as to be of the order of $10^{-4}/°$C. or less. Particularly, thermo-plastic resins, thermo-setting resins, ultraviolet-curable resins and liquid-crystal polymers, such as those having a positive coefficient of linear expansion of from $10^{-6}$ to $10^{-4}/°$C. are more preferable.

Embodiment 1

Figure 2:
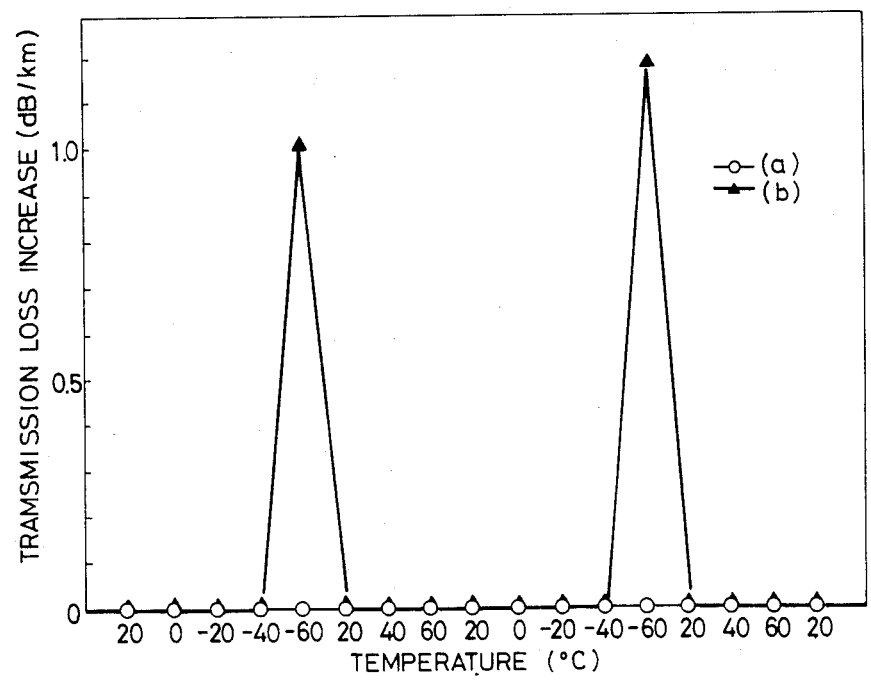
FIG. 2 is a graph of transmission loss increase versus temperature showing the comparison between an optical fiber coated with the resin composite of the invention and an optical fiber coated only with a liquid-crystal polymer having a negative coefficient of linear expansion.

A liquid-crystal polymer (VECTRA A-900, aromatic liquid-crystal polymer) having a negative coefficient $\alpha$ of linear expansion and a resin (Nylon 12) having a positive coefficient $\alpha'$ of linear expansion were united into one body to thereby prepare a resin composite. An optical fiber (a) was coated with the resin composite as shown in FIG. 1. As a comparative example, another optical fiber (b) was coated only with the same liquid-crystal polymer having a negative coefficient $\alpha$ of linear expansion. The increasing quantity of transmission loss in each of the two fibers (a) and (b) with the temperature change of from $-60°$ C. to $+60°$ C. was measured as shown in FIG. 2. In Fig. 2, the white circles refer to the fiber (a), and the black triangles refer to the fiber (b).

The optical fiber (b) coated only with the liquidcrystal polymer exhibited the increased quantity of transmission loss to reach into 1.0 dB/km at the low temperature of $-60°$ C., but the optical fiber (a) coated with the resin composite of the invention exhibited no increase of transmission loss.

In this embodiment the optical fiber is formed of glass or plastic with the outside diameter of 0.125 mm, and the cushion layer is composed of thermo-setting silicone or ultraviolet-curable resin with the thickness of 0.1375 mm. The thickness of the resin having a negative coefficient of linear expansion is 0.25 mm, and the thickness of the resin having a positive coefficient of linear expansion is 0.15 mm.

Embodiment 2

Graded-Index(GI) type (core/clad diameter: 50/125 $\mu m\phi$) optical fiber glass was coated with an ultraviolet-curable resin to thereby prepare a 0.3 mm$\phi$ buffered optical fiber. The buffered optical fiber was coated by extrusion with a liquid-crystall polymer (VECTRA A-900) of a negative coefficient of linear expansion $(-5\times 01^{-6}$ to $-8\times 10^{-6}/°$C., and then coated with a denatured liquid-crystal polymer (UNITICA, Ltd., LC2010B) having a positive coefficeint of linear expansion $(1\times 10\text{-}5 /°$ C.) to thereby prepare a coated optical fiber. The thickness of each of the liquid-crystal polymers respectively having a positive coefficient and a negative coefficeint of linear expansion is 0.225 mm.

The transmission loss of coated optical fiber was measured (measurement wavelength $\lambda = 0.85$ $\mu m$) with the temperature change of from $-60°$ to $+80°$ C. As a result, there was no increase of transmission loss.

Although the above-decribed embodiments have shown the case where an optical fiber is used as an example of composition in the vicinity of the resin composite, it is a matter of course that the invention is applicable to the case where other compositions easily influenced by distortion from the outside are used in the vicinity of the resin composite.

As described above, the resin composite according to the present invention has the effect that the distortion of the other compositions in the vicinity of the resin composite with the change of temeprature is so reduced as to be almost zero, becasuse the resin having a negative coefficient $\alpha$ of linear expansion and the resin having a positive coefficeint $\alpha'$ of linear expansion are united into one body to have a geometrical function. Particularly, the resin composite is suitable for use in the condition of low temperature. Accordingly, the resin composite according to the invention has an advantage in use for precise plastic materials, heat-resistant transformable materials, optical fiber coating materials and the like, and can contribute to the improvement in performance thereof.

Although the aforementioned embodiment has shown the case where the resin composite of the present invention is prepared by combining two types of resins, which are different in sign of the coefficient of linear expansion from each other, into one body in the form of two layer, the invention is applicable to the case where the resin composite may be prepared by combining such resins into one body in the form of multilayers as occassion demands.

In the present invention, the measurements of the coefficient of linear expansion were carried out on a TMA made by Rigaku Denki K.K., under the conditions of a load of 2 g, a sample length of 20 mm and a temperature rising rate of 1.25° C./min.

What is claimed is:

1. A coated optical fiber comprising an optical fiber, first layer formed over said optical fiber and second layer formed over said first layer, said first and second layers being composed of a first resin having a negative coefficient of linear expansion and a second resin having a positive coefficient of linear expansion, respectively.

2. The coated optical fiber as claimed in claim 1, wherein said first resin is composed of a highly oriented resin.

3. The coated optical fiber as claimed in claim 1, wherein said first resin is composed of liquid-crystal polymers.

4. The coated optical fiber as claimed in claim 3, wherein said liquid-crystal polymers are thermo-plastic and have coefficient of linear expansion from the order $-10^{-5}/°$ C. to the order $-10^{-7}/°$ C.

5. The coated optical fiber as claimed in claim 1, wherein said second resin has a positive coefficient of linear expansion of the order $10^{-4}/°$ C. or less.

* * * * *